Dec. 11, 1951      J. R. GREEN      2,578,184
OIL FILLER NECK EXTENSION FOR AUTOMOBILE ENGINES
Filed June 11, 1946
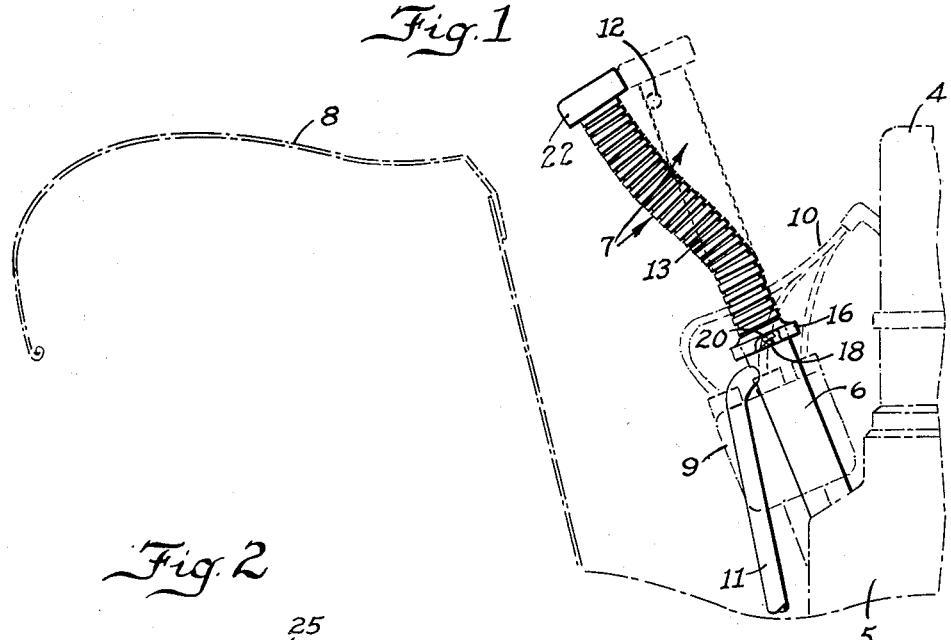
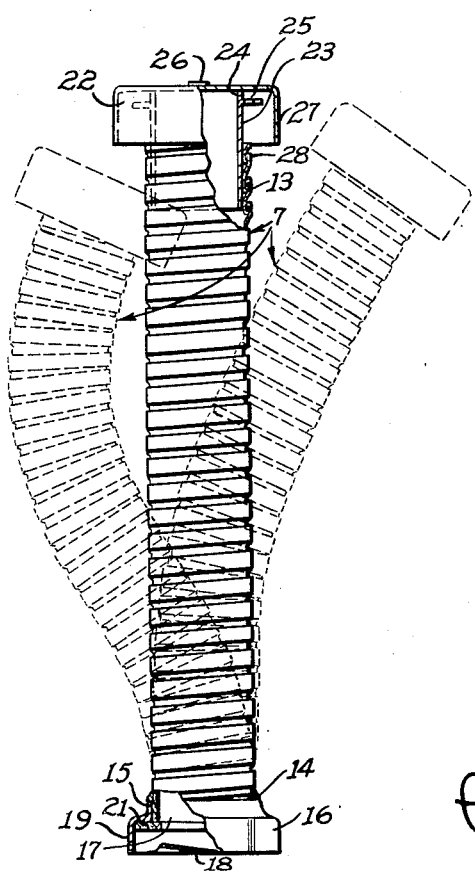
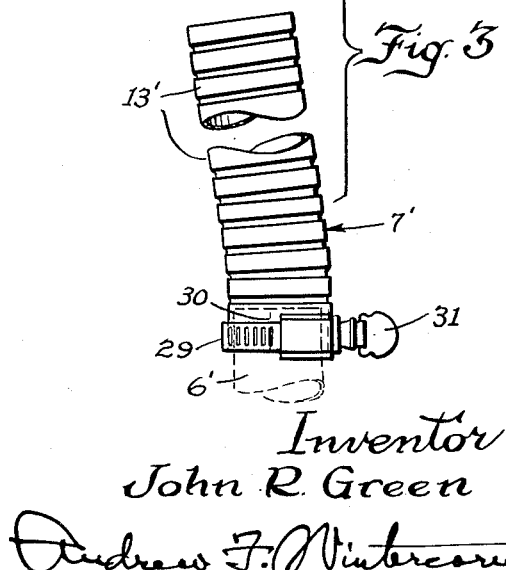
Inventor
John R. Green Patented Dec. 11, 1951

2,578,184

UNITED STATES PATENT OFFICE 2,578,184

OIL FILLER NECK EXTENSION FOR AUTOMOBILE ENGINES

John R. Green, Belvidere, Ill.

Application June 11, 1946, Serial No. 676,066

3 Claims. (Cl. 121—194)

This invention relates to a new and improved oil filler neck extension for automobile engines.

Some makes of cars come equipped with a filler neck so short and located so low in the engine space that service station attendants have experienced considerable difficulty putting in oil. Furthermore, due to the close proximity of the filler neck to the distributor the awkwardness of the filling operation in these cars frequently ended in the oil being spilled all over the distributor. It is, therefore, the principal object of my invention to provide an extension easily attachable to the existing filler neck, the extension being constructed of semi-flexible metal hose for the threefold purpose of:

(a) Avoiding interference with screwing onto the neck the cap on the lower end of the hose, where the angle of the neck and the confined space combined with the necessary length of the hose prohibits use of a rigid non-flexible tube;

(b) Permitting buckling of the hose to avoid a tie-rod, of which there are two in some cars on opposite sides of the engine to brace the radiator from the dash, the one rod being above the filler neck where it would interfere with the use of an extension of satisfactory length if a rigid non-flexible tube were used, and (c) Enabling curving the hose more or less permanently to remain clear of the tie rod or any other metal part of the car, whereby to avoid rattling, or to remain out of chafing contact with heater hose connections, there being sufficient inherent stiffness in the semi-flexible metal hose used to insure its keeping a specified shape indefinitely, regardless of the vigorous movement of the filler neck as a result of the modern "floating power" engine mounts.

The invention is illustrated in the accompanying drawing, in which

Fig. 1 is a fragmentary view of an automobile engine and an adjacent front fender showing the filler neck on the side of the engine crankcase on which an extension made in accordance with my invention has been applied, the same having been curved to avoid and stay clear of a tie rod disposed near the upper end of said extension;

Fig. 2 is a larger view of said extension, certain portions of which have been shown in section to better illustrate the construction, and two moved positions being indicated in dotted lines, one on a simple arc and the other on a compound or ogee curve, to show the adaptability of the extension device to different installations, and Fig. 3 is a side view of another extension of modified construction usable on some engines where the filler cap has only a slip fit, an intermediate portion of the semi-flexible metal hose being broken away to permit showing the construction on a larger scale.

Similar reference numeral are applied to corresponding parts in these views.

Referring to Figs. 1 and 2, the reference numeral 4 designates the engine on the crankcase 5 of which is the oil filler neck 6 with which my invention of the extension device 7 is particularly concerned. At 8 is indicated the right front fender of the car, which is usually at an elevation about level with the top of the engine and extends quite far away from the engine so that the filler neck 6 is hard to reach, especially for any filling station attendant of short or even medium stature. This inconvenient location of the filler neck 6 often led to oil being spilled and wasted, which is bad enough in itself, but there was also the likelihood of the oil being spilled onto the nearby distributor and grounding one or more of the leads to the spark plugs. The distributor projects from the crankcase alongside the filler neck and is indicated at 9, and the spark plug leads are shown at 10. An attendant, besides having difficulty putting in oil, was also apt not to be careful enough in applying the cover cap on the filler neck, which in some cars are fastened with a bayonet locking action that requires a full quarter turn for secure fastening, and hence there was also danger of these caps being lost as a result of the inconvenient location of the filler neck. Another difficulty with this unimproved filler neck 6 is that the breather pipe 11, which extends downwardly from the side of the neck near the upper end and is intended to serve as a vent for the crankcase, is apt to be clogged by dirt splashed onto the lower end of the pipe. The extension 7, as will soon appear, is designed to provide an auxiliary vent in case the breather pipe is out of commission. The location of a tie rod 12 about midway between the top of the engine 4 and the fender 8 presents a problem in so far as providing a filler neck extension of suitable length is concerned; the extension 7, however, is sufficiently flexible to permit curving the same to avoid the tie rod, as shown in Fig. 1. The extension 7, as indicated in Fig. 2, comprises a tubular body 13 made of semi-flexible tightly jointed metal hose, the lower end of which is soldered as indicated at 14 in a neck 15 formed by a flange on the top of a sheet metal cap 16. The latter is like the cap originally used on the filler neck, except, of course, for the center opening 17 defined by the neck 15, which is not provided in the closure cap, for obvious reasons, and has a plurality of circumferentially spaced inwardly projecting inclined lugs 18 on the lower edge of the rim 19 to cooperate with similarly spaced lugs 20 on the outside of the filler neck to provide for a bayonet locking and camming action in the application of the extension device 7 to the filler neck, whereby to make an oil-tight seal at this joint. A cork gasket 21 fitting snugly in the cap 16 against the top wall is compressed between the filler neck and the cap to insure a good seal. A sheet metal closure cap 22 having a tubular neck portion 23 adapted to fit snugly in the upper end of the extension body 13 serves as a vent type cap for the extension because there are vent openings 24 in the upper end of the neck 23 formed where lugs 25 are bent outwardly from the upper end of the neck, these lugs serving to limit the downward movement of the cap in the application of the cap to the extension so that the vent openings 24 cannot be closed. Other lugs 26 on the upper end of the neck 23 entered through slots in the cap are bent over the top of the cap to fasten these parts together. The downwardly projecting annular skirt 27 is spaced from the vent openings 24 and serves to protect these openings against entry of dirt and bugs.

In operation, it should be evident from Fig. 1 that the application of the extension 7 avoids the difficulties mentioned above that were due to the lowness of the filler neck 6, because the upper end of the extension is at or above the level of the fender 8 where it is easy to reach to put in oil. The semi-flexibility of the metal hose used in the extension makes it easy to apply the cap 16 to the filler neck by permitting curvature of the extension so as to dispose the cap in the proper plane relative to the filler neck, and also by permitting whatever further bending of the extension may be necessary in screwing the cap onto the filler neck. After the extension 7 is applied it can be bent or flexed as a whole with reference to the cap 16 to be spaced at its upper end far enough from the tie rod 12 to permit easy application and removal of the closure cap 22 and also eliminates likelihood of rattling by any part of the extension coming in contact with the tie rod when the car is running. Also, if any special curvature of the extension is desired, as, for example, in order to avoid rubbing on heater hose connections or to avoid rattling contact with any adjacent metal part on the car, the semi-flexible metal hose can be given a more or less permanent curvature of kink with that purpose in view, and the metal hose will keep this shape indefinitely due to its inherent stiffness and the frictional resistance to deformation set up between the interfitting coils or turns of which the metal hose is made. Incidentally, as clearly shown at 28 in Fig. 2, the joints in the tube 13 are formed by interfitting flanges and channels on the edges of adjoining coils of the metal hose, which is made from a single continuous helical strip of sheet metal, and the joints are disposed with the flanges upwardly directed into downwardly open channels so that oil coming in contact with the inside walls of the extension 7 will drain into the crankcase and there will therefore be little or no danger of loss by seepage through the flexible joints of the extension to the outside of said extension. It is, of course, due to the tight friction fit of the flanges in the channels of the joints that the tube 13 can be flexed only with appreciable force applied, and that it tends to retain the shape given it. The cap 22 on the extension 7 serves as an auxiliary vent so that it is immaterial if the breather pipe 11 gets clogged. Thus the extension 7 serves that additional purpose too.

Where the filler neck on the crankcase of an engine is smooth on its outside and is designed to receive a slip-on style of friction cap, I may use a similar semi-flexible metal hose type of body 13' for the extension 7', as shown in Fig. 3, using the same vent type closure cap 22, but, instead of the cap 16, a metal hose clamp 29 is provided encircling the lower end of the metal hose 13', which, as indicated at 30 is slitted on one side to facilitate slipping the end of the hose over the smooth upper end of the filler neck 6'. The clamp 29 is arranged to be contracted by turning the key 31, in a well-known manner, so as to close the slit 30 tightly and clamp the hose with an oil tight fit on the neck 6'. This device then operates the same as that previously described and affords the same advantages.

It is believed the foregoing description conveys a good understanding of the objects and advantages of my invention. The appended claims have been drawn to cover all legitimate modifications and adaptations.

I claim:

1. As an oil filter neck extension for permanent attachment to the filler neck of an automobile engine to facilitate pouring in oil, comprising means for attaching one end of a filler neck extension to the filler neck so as to conduct oil thereto, and an openable closure for the other end of said extension, the improvement which consists in the provision of an extension the tubular body of which is a thin-walled, semi-flexible, multitudinously-jointed metal hose adapted to be flexed forcibly by hand to a predetermined contour to avoid contact with adjacent parts of the engine or automobile but, by reason of the stiffness of the joints, having sufficient inherent stiffness to resist appreciable change from a given shape by vibration transmitted to it from the attached end.

2. A lubricating attachment for engines having an upright filler pipe, comprising an upright metal hose equipped with a connector at its lower end for connection to the upper end of the filler pipe, said hose having the wall thereof formed by a single continuous helical strip of sheet metal one edge portion of which is bent upon itself to provide an external flange and the other edge of which is bent upon itself to provide an internal channel, the channel of one coil of said helix closely receiving the flange of the next coil, and so forth, whereby a multitudinously-jointed metal hose is provided, which, by reason of the stiffness of the joints, resists appreciable change from a given curvature, the hose being fixedly supported only by the connector at its lower end and so arranged relative to the connector on its lower end that the channels face toward said lower end and the flanges project toward the upper end.

3. For attachment to a filler neck on an internal combustion engine, in place of a screw-on closure cap, an extension device comprising an elongated tubular body, a mounting cap designed to screw on the neck and having one end of said tubular body entered in an opening provided therein and attached thereto for sole support of said tubular body by its one end in an upright position, and a removable closure cap for the other end of said tubular body, said tubular body being of semi-flexible multitudinously-jointed metal hose adapted to be flexed by hand to a predetermined contour to avoid contact with adjacent parts of the engine but, by reason of the stiffness of the joints, having sufficient inherent stiffness to resist appreciable change from a given curvature longitudinally by vibration transmitted to it from the attached end.

JOHN R. GREEN.

REFERENCES CITED

The following references are of record in the file of this patent:

UNITED STATES PATENTS

| Number | Name | Date |
| --- | --- | --- |
| 1,351,338 | Magee | Aug. 31, 1920 |
| 1,461,436 | Arrigoni | July 10, 1923 |
| 1,537,159 | Cummings et al. | May 12, 1925 |
| 1,662,820 | Condupa | Mar. 20, 1928 |
| 2,417,676 | Chernack | Mar. 18, 1947 |